(12) United States Patent
Moilanen et al.

(10) Patent No.: US 12,441,538 B2
(45) Date of Patent: Oct. 14, 2025

(54) LOCAL NODE FOR A WASTE MANAGEMENT SYSTEM

(71) Applicant: Teknologian tutkimuskeskus VTT Oy, Espoo (FI)

(72) Inventors: Ilkka Moilanen, Oulu (FI); Markku Kiviranta, Oulu (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 0 days.

(21) Appl. No.: 18/270,746

(22) PCT Filed: Dec. 21, 2021

(86) PCT No.: PCT/FI2021/050900
§ 371 (c)(1),
(2) Date: Jul. 3, 2023

(87) PCT Pub. No.: WO2022/148901
PCT Pub. Date: Jul. 14, 2022

(65) Prior Publication Data
US 2024/0059484 A1 Feb. 22, 2024

(30) Foreign Application Priority Data
Jan. 5, 2021 (FI) ...................... 20215007

(51) Int. Cl.
*B65F 1/14* (2006.01)
*G01S 13/42* (2006.01)
*G01S 13/86* (2006.01)
(52) U.S. Cl.
CPC ............ *B65F 1/1484* (2013.01); *G01S 13/42* (2013.01); *G01S 13/86* (2013.01); *B65F 2210/128* (2013.01); *B65F 2210/1443* (2013.01)

(58) Field of Classification Search
CPC .............. B65F 1/1484; B65F 2210/128; B65F 2210/1443; G01S 13/42; G01S 13/86
See application file for complete search history.

(56) References Cited

U.S. PATENT DOCUMENTS 9,517,912 B2 * 12/2016 Brizzi .................... B65H 33/14
10,223,667 B2 * 3/2019 Repensek ............ G06Q 20/102
(Continued)

FOREIGN PATENT DOCUMENTS

CH          701 677 A2      2/2011
CN       105245846 A  *    1/2016
(Continued)

OTHER PUBLICATIONS

Radovan Novotny, "Smart City Concept, Applications and Services," 2014, Journal of Telecommunications System & Management, vol. 3, Issue 2, pp. 1-8. (Year: 2014).*
(Continued)

*Primary Examiner* — Tan D Nguyen
(74) *Attorney, Agent, or Firm* — Birch, Stewart, Kolasch & Birch, LLP (57) ABSTRACT

An enhanced local node to be installed to a waste collection site. A radio interface unit is configured for communication using signals specified for radio access in a radio access network, and a radar unit is configured to use information on received or transmitted signals of the radio interface unit to determine a distance from the local node to refuse objects inside a container. The local node thus uses the same signals to detect a fill state of a container and to transmit the fill state of the container from the local node to the control node.

12 Claims, 4 Drawing Sheets

(56) References Cited

U.S. PATENT DOCUMENTS

| | | | | |
|---|---|---|---|---|
| 2016/0134939 A1* | 5/2016 | Picco | ............... | H04N 21/47202 |
| | | | | 725/93 |
| 2017/0097405 A1* | 4/2017 | Lerner | .................... | G01S 13/42 |
| 2018/0074179 A1* | 3/2018 | Liao | ..................... | G01S 13/887 |
| 2018/0137458 A1 | 5/2018 | Repensek | | |
| 2018/0239144 A1* | 8/2018 | Woods | .................. | A63F 13/213 |
| 2018/0300897 A1* | 10/2018 | Woods | .................. | G06F 3/0481 |
| 2018/0322389 A1* | 11/2018 | O'Shea | .................... | G06N 3/08 |
| 2019/0293784 A1* | 9/2019 | Khalid | .................... | G01S 13/87 |
| 2019/0317203 A1* | 10/2019 | Rosson | .................. | G01S 13/46 |
| 2020/0020239 A1* | 1/2020 | Chen | .................... | G08G 5/0021 |
| 2022/0365168 A1* | 11/2022 | Amizur | .................. | G01S 7/003 |

FOREIGN PATENT DOCUMENTS

| | | | | | | |
|---|---|---|---|---|---|---|
| CN | | 105247385 | A | * | 1/2016 | ........... G01S 13/878 |
| CN | | 105357484 | A | * | 2/2016 | |
| CN | | 109073741 | A | * | 12/2018 | ........... G01S 13/325 |
| CN | | 109239668 | A | * | 1/2019 | ............ G01S 13/26 |
| CN | | 109557940 | A | * | 4/2019 | |
| CN | | 110088644 | A | * | 8/2019 | ............... G01S 5/06 |
| WO | WO | 2016/071561 | A1 | | 5/2016 | |
| WO | | WO-2018107528 | A1 | * | 6/2018 | ............ G01S 7/497 |
| WO | | WO-2020264434 | A1 | * | 12/2020 | ......... E05B 47/0001 |
| WO | | WO-2021086525 | A1 | * | 5/2021 | ........... G01S 13/003 |

OTHER PUBLICATIONS

Kellow Pardini, "IoT-Based Solid Waste Management Solutions: A Survey," Jan. 1, 2019, Journal of Sensor and Actuator Networks, pp. 1-25. (Year: 2019).*
Theodoros Anagnostopoulos, "Challenges and Opportunities of Waste Management in IoT-Enabled Smart Cities: A Survey" 2017, IEEE Transactions on Sustainable Computing, vol. 26, pp. 275-289. (Year: 2017).*
Ozgur Akan, "Internet of Radars: Sensing versus sending with Joint Radar-Communication" 2020, IEEE Communications Magazine , Sep. 2020, pp. 13-19 (Year: 2020).*
Ozgur B. Akan, "Internet of Radars: Sensing versus Sending with Joint Radar-Communications," 2020, IEEE Communications Magazine, Sep. 2020, pp. 13-19. (Year: 2020).*
Finnish Office Action, issued in Priority Application No. 20215007, dated Aug. 27, 2021.
Finnish Search Report, issued in Priority Application No. 20215007, dated Aug. 27, 2021.
International Search Report, issued in PCT/FI2021/050900, dated Mar. 22, 2022.
Mohan et al., "A Waste Collection Mechanism based on IoT", 2017 14th IEEE India Council International Conference (INDICON), IEEE, Dec. 15, 2017, pp. 1-5.
Written Opinion of the International Searching Authority, issued in PCT/FI2021/050900, dated Mar. 22, 2022.

* cited by examiner

LOCAL NODE FOR A WASTE MANAGEMENT SYSTEM

TECHNICAL FIELD

The present application relates to waste management systems, and more particularly to a local node for a waste management system, a container, and a method implemented in the local node.

BACKGROUND

In commercial and residential sites, garbage is sorted into different types of containers that are regularly emptied with trucks. These trucks have regular routes and some of them may include special equipment for the type of garbage they collect. Presently, there is a clear need to reduce costs of waste management and to avoid unnecessary carbon emissions.

This would be possible, if the emptying interval and route of garbage trucks were optimized so that their route is dynamically planned according to the waste level. However, to achieve this, a waste management service provider should be able to remotely monitor fill states of different types of containers it provides. This networked mode of operation should be implemented efficiently and without incurring significant additional costs.

SUMMARY

Examples of the invention are set out in the claims and include an apparatus for a waste management system, a method to be implemented in the apparatus, and a container including the apparatus.

According to an example aspect of the invention there is provided a local node of a waste management system, comprising a radio interface unit configured for communication using signals specified for radio access in a radio access network; a radar unit; an interface enabling exchange of information between the radio interface unit and the radar unit; wherein the radar unit is configured to receive from the radio interface unit predefined information on one or more signals transmitted or received by the radio interface unit; the radar unit is configured to use the predefined information as radar input data; the radar unit is configured to determine a distance from the local node to objects inside a container from the radar input data received from the radio interface unit; the radar unit is configured to determine a fill state of a container from the determined distance; the radar unit is configured to generate an indication of the fill state of the container and forward it to the radio interface unit; and the radio interface unit is configured to transmit the indication of the fill state of the container to a control node of the waste management system.

In an example embodiment, the predefined information conveys an indication of a delay of a signal that is transmitted and then reflected from the objects inside the container.

In an example embodiment, the radar unit is an active radar configured to determine the delay as a time of flight of a signal transmitted by the radio interface unit and then reflected from the objects inside the container; and determine the distance from the local node to objects inside the container from the determined time of flight.

In an example embodiment, the radar unit is a passive radar configured to receive from the radio interface unit a synchronisation sequence between the radio interface unit and an access node of the applied radio access network; estimate the delay from correlation of a signal with a delayed copy of itself in the synchronisation sequence; and determine the distance from the local node to objects inside the container from the estimated delay.

In an example embodiment, the one or more signals of the predefined information are signals transmitted or received by the radio interface unit independently of the operation of the radar unit.

In an example embodiment, the radio interface unit is configured to transmit one or more signals in response to a request by the radar unit; the radar unit is configured to receive from the radio interface unit predefined information related to the one or more transmitted signals; and the radar unit is configured to compute the delay from the radio interface unit predefined information related to the one or more transmitted signals.

In an example embodiment, the radar unit is configured to use the predefined information to detect a user closing the site or the container; and the radar unit is configured trigger a user service function in response to the detection of the user.

In an example embodiment, the user service function includes activation of a software application in the local node.

In an example embodiment, the local node includes a mechanical opening system arranged to respond to a predefined input signal by opening access to the container; the local node is arranged to provide the predefined signal in response to receiving information that confirms identity of a user of the container.

In an example embodiment, the radar unit is configured to use the predefined information from the radio interface unit to compute a form of an object that a user intends to insert into the container; the radar unit is configured to detect if the detected form of the object is compliant with parameters predefined for the container; the radar unit is configured to trigger an output of a user indication, if the detected form of the object is not compliant with parameters predefined for the container.

According to another example aspect of the present invention, there is a provided a container including a local node of the previous aspect or any related embodiment.

According to a further example aspect of the present invention, there is a provided method, comprising processing the method in a local node of a waste management system; using signals specified for radio access in a radio access network for communication in the radio access network; using predefined information on one or more signals transmitted or received by the radio interface unit as radar input data; determining a distance from the local node to objects inside a container from the radar input data; determining a fill state of a container from the determined distance; generating an indication of the fill state of the container; and transmitting the indication of the fill state of the container to a control node of a waste management system.

BRIEF DESCRIPTION OF THE DRAWINGS

In the following, example embodiments are described in greater detail with reference to the accompanying drawings, in which.

DETAILED DESCRIPTION

The following detailed description is exemplary in nature and is not intended to limit the disclosure or the application and uses thereof. Furthermore, there is no intention to be bound by any theory presented in the preceding background or the following detailed description. As used herein, the term node refers to any hardware, software, firmware, electronic control component, processing logic, and/or processor device, individually or in any combination.

Figure 1:
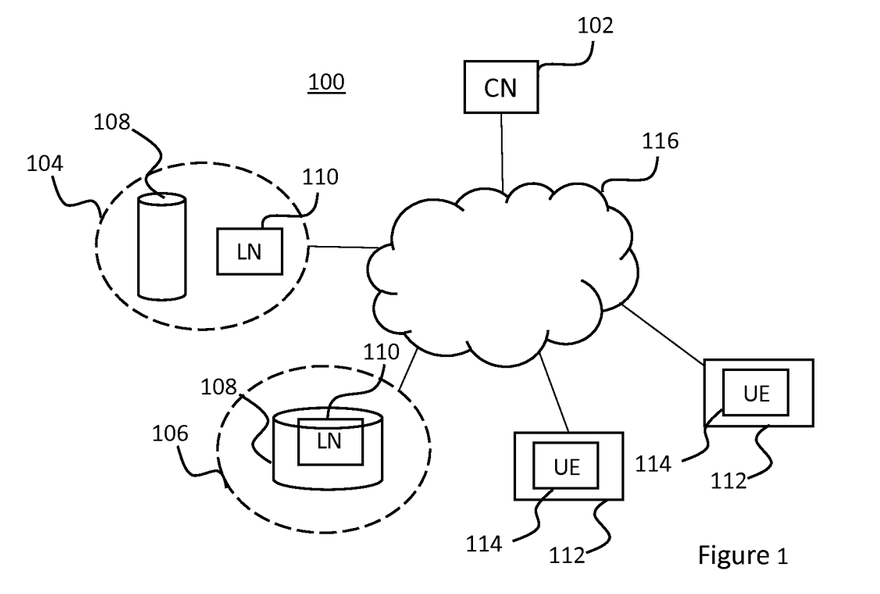
FIG. 1 illustrates exemplary elements of a networked waste management system.

FIG. 1 illustrates exemplary elements of a networked waste management system 100 that comprises at least one control node (CN) 102, and one or more waste collection sites 104, 106. Each waste collection site 104, 106 includes one or more containers 108, and one or more local nodes (LN) 110 for monitoring fill states of the containers. A container refers here to a receptacle for refuse, for example, a waste bin, rubbish bin, dumpster, or the like. A container includes an empty space that is gradually filled with refuse, and a fill state of the container can be monitored, for example, by detecting objects that accumulate to the container and decrease the volume of the empty space within the container. The waste management 100 system also includes mobile nodes 112, for example trucks that move between local nodes 110 to clean and empty the containers 108 in them. Mobile nodes 112 are advantageously also equipped with a communications device 114.

In order to implement a networked mode of operation, the control node 102, the local nodes 110 and the communications devices 114 are communicatively connected through a communications network 116. Communicatively connected in this context means that the connected entities can communicate with each other, but they do not need to interface the communications network through one type of access network only. For example, in this example, a local node 110 of a first waste collection site 104 may be configured to communicate with the control node 102 over a radio interface RI of one specified radio access network, like 5G NR. A local node 102 of another waste collection site may apply the same radio interface, or a different one, like 4G LTE. Mobile nodes 112 may apply either of these or even some other radio interface. The control node 102 may similarly apply some publicly available radio interface or connect to the network by means of cabling or a dedicated wireless connection.

In a networked operation mode of the example waste management system, the local node 110 determines a fill state of one or more of the containers 108 in the local waste collection site and communicates the detected fill states to the control node 102. This enables the control node 102 to control schedules and routes of the trucks 112 that empty the containers in the local waste collection sites.

It should be noted that FIG. 1 is an illustrative example only. For example, the control system may be hierarchic so that one or more of the waste collection sites includes a local control node that controls some operations of the waste management system in that particular site locally.

Conventionally, the local fill state monitoring function has been implemented with some type of a gauge that has been installed into the container and coupled to a separate transceiver for radio access. Examples of such traditional gauges include sensors, like an ultrasonic sensor, infrared sensor, pressure sensor, weight sensor, ultra wideband radar sensor, CCD camera sensor, laser sensor, accelerometer, humidity sensor, gas sensor, ambient light sensor and temperature sensor. Another known variant of gauges includes a radar that can be mounted to a container and be directed to sweep towards a detection area. The radar can be configured to calculate a fill degree of the container from an aggregate of reflections of the sweep from the detection area. The disadvantage of these solutions is that they require two separate apparatuses, one for fill rate sensing and another to deliver information on the determined fill degree to the remote control node. In either of these conventional solutions, the local node needs to include components and power supply for two separately functioning devices, which increases energy consumption, cost and, in many ways, also complexity of the overall technical arrangement.

The present example discloses an enhanced waste management system that introduces a local node to be installed to a waste collection site. The modified local node is an apparatus that includes a radio interface unit and a radar unit. The radio interface unit is configured for communication using signals specified for radio access in a radio access network. In other words, the radio interface unit includes hardware and processes that control the hardware so that the radio interface unit can communicate over a radio interface of a specific radio access network. A radio interface for accessing services of a radio access network is, as well known, formed through a very detailed set of definitions, agreed jointly through multilateral co-operation in the telecommunication field. In general, the term signal refers to an electromagnetic wave that carries information. In this context the term signal refers more specifically to a modulated waveform that operates in an allocated bandwidth of a radio access network and fulfils requirements that are defined in radio interface specifications to enable communications devices to transmit and receive information in that radio access network.

The radar unit is arranged for joint operation with the radio interface unit and therefore uses information on received or transmitted signals of the radio interface unit to determine a distance from the local node to refuse objects inside a container. Signals used in communications of the radio interface unit can be used as a basis for a delay estimate calculation, and a range, and thus the distance from the local node to a boundary of the refuse that fills a container can be calculated from the delay estimate. The calculated distance can then be applied to determine the fill state of the container. Accordingly, the local node can use the same signals to detect a fill state of a container and to transmit the fill state of the container from the local node to the control node.

The described integration of radar and communication functions provides a more efficient technique to collect fill state information from waste collection sites, both from the use of spectrum point of view, and the energy efficiency point of view. When same signals are used for measuring the fill state and communications of the local node, only one bandwidth allocation is needed for transmissions of both functions. From the implementation point of view, the integration of functions means lower costs through hardware reuse. Furthermore, in the integrated mode of operation, less circuit power is consumed, which improves energy efficiency of the local nodes. It should be noted that waste management systems even in one regional area can already include a huge number of sites with local nodes in each one of them. With the ability to provide the local monitoring function with signals of one integrated device instead of separate communication and radar devices, the impact to total energy consumption is very high.

Figure 2:
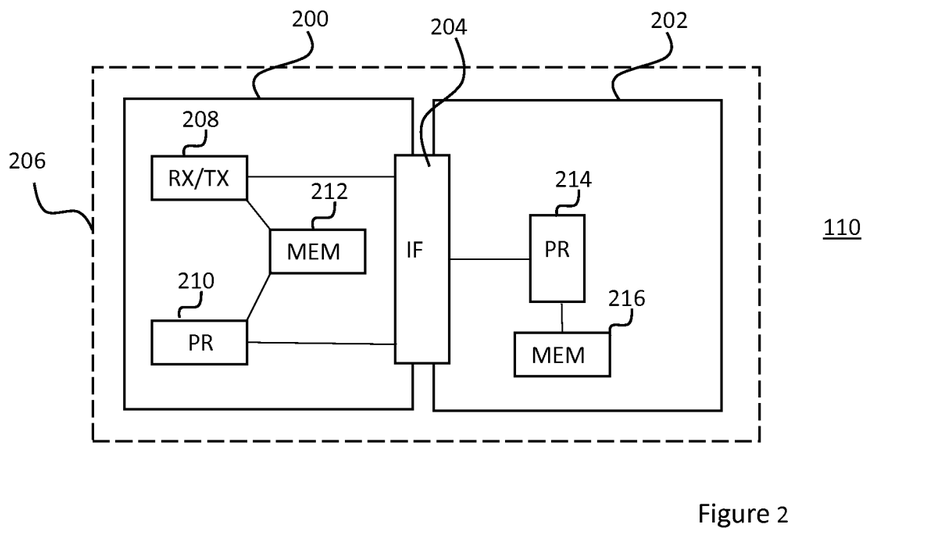
FIG. 2 shows a schematic unit view of an example local node.

FIG. 2 shows a schematic block view of an example local node 110 of FIG. 1. The phrase "being configured to", as used in this application, shall be understood as being specifically programmed, laid out, furnished or arranged to. The local node is advantageously an apparatus that comprises a radio interface unit 200, a radar unit 202 and an interface 204 between them. The units 200, 202 can be implemented as mechanically separate elements that are fixedly attached to each other, or as a joint functional device where some or all functions are implemented using common physical elements. Advantageously, the apparatus includes a casing 206 that provides a protective cover for the enclosed units 200, 202 and enables attachment of the units to a defined position in a surface that is inside or outside a container.

The radio interface unit 200 of FIG. 2 represents hardware and software elements of the local node that are configured to jointly implement functions of the radio interface unit described in this document. The radio interface of the radio access network is a tetherless interface between the local node and an access point of a radio access network. Use of the term thus indicates here that a set of predefined definitions that regulate the form of transmissions needs to be applied in communications over the radio interface of the radio access network. Examples of such radio access network definitions include radio interface technologies specified in the auspices of the 3rd Generation Partnership Project (3GPP), and Institute of Electrical and Electronics Engineers (IEEE).

The radio interface unit of FIG. 2 includes a radio transceiver block (RX/TX) 208, a processor (PR) 210 and a memory (MEM) 212. The radio transceiver block 208 refers here to elements of the radio interface unit that are applied to receive a data stream from the processor 210 and convert it to a signal transmitted over a radio interface of a radio access network. Correspondingly, radio transceiver block 208 is configured to receive a signal over the radio interface of the radio access network, convert it into a data stream and forward it for further processing to the processor 210. The radio transceiver block 208 includes an antenna system that provides a predefined radiation pattern for the received and transmitted signals.

As an example, in 3GPP specifications, physical channels are conveyed in the air interface by a set of modulated waveforms, carriers. Depending on the applied radio interface technology, a physical channel may be defined by a timeslot, code, frequency, or relative phase. Accordingly, each radio access network applies a specified waveform for signals that are transmitted in an operating bandwidth allocated for the radio access network.

The processor 210 represents here a combination of one or more computing devices for performing systematic execution of operations upon predefined data. The processor may comprise one or more arithmetic logic units, a number of special registers and control circuits. The processor may comprise or may be connected to a memory 212 that provides a data medium where computer-readable data or programs, or user data can be stored. The memory unit may comprise one or more units of volatile or non-volatile memory, for example EEPROM, ROM, PROM, RAM, DRAM, SRAM, firmware, programmable logic, etc. As described above, the processor 210 may be configured to co-operate with the radio transceiver block 208 and store data to the memory 212. On the other hand, the processor may retrieve the computer-readable data or programs, or user data from the memory 212 and use that to control operations of the radio transceiver block 208.

The interface (IF) 204 represents here hardware and software elements of the local node that are applied jointly to implement a shared boundary across which the radio interface unit and the radar unit exchange information. The interface 204 may be implemented as two mutually communicating blocks arranged to the interfaced units, or as an internal interface so that data streams are controllably distributed to the functions of the radio interface unit and to the functions of the radar unit.

The radar unit 202 of FIG. 2 represents hardware and software elements of the local node that are applied to jointly implement functions of the radar unit described in this document. The term radar refers in general to a system that uses radio waves to determine range, angle, or velocity of objects. When electromagnetic waves travel through one material meet another material, the waves reflect or scatter from the boundary between the materials. Accordingly, radio waves from a transmitter reflect off an object and return to the receiver, and a delay detected though reflected radio waves gives an indication of a location of the object causing the reflection. In examples of this document, the radar unit detects the delay from information on one or more transmitted or received signals of the radio interface unit, as will be described in more detail in this document. The term radar unit represents also the additional functions of the local node implemented to monitor and communicate the fill states in the waste management system.

In FIG. 2, the radar unit 202 is shown to include a processor 214 and a memory 216. However, as discussed earlier, the radar unit and the radio interface unit can be a joint operational device where some or all functions are implemented using common hardware or software elements, like the common processor and memory elements, and algorithms controlling operations of them.

It should be noted that only elements essential for describing the example have been shown in FIG. 2. For a person skilled in the art it is clear that the local node may include further mechanical and/or functional elements not disclosed herein. For example, the local node may include a user interface with a keypad, a touch screen, a microphone, or equals for inputting information and a screen, a touch screen, a loudspeaker, or equals for outputting information to a user of the local node.

Figure 3:
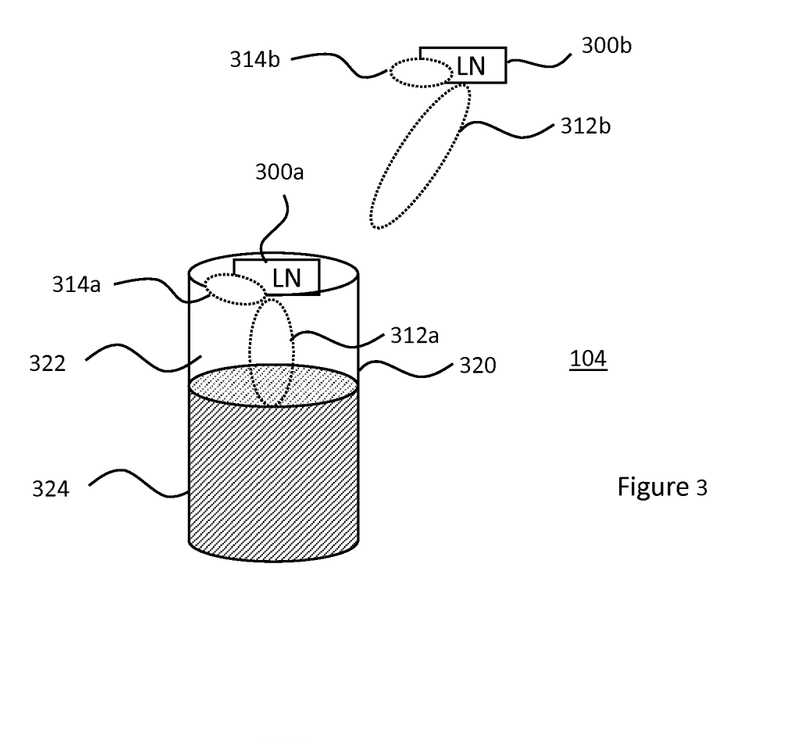
FIG. 3 illustrates a setup in a local waste collection site.

FIG. 3 illustrates a setup for implementing an example embodiment in a local waste collection site 104 of FIG. 1. FIG. 3 shows a container 320 in which upper part 322 of the container is empty and the lower part 324 of the container is filled with refuse. FIG. 3 shows two exemplary locations for positioning the local node. A first local node 300a illustrates a setup where the local node is attached to the inner or outer walls of the container. The local node may be even integrated to the container so that they form one jointly delivered sales item. A second local node 300b illustrates a setup where the local node is attached to another fixed position locally offset from the container 320.

The antenna system of the radio transceiver block of the local node 300a, 300b may be adjusted to create a radiation pattern that serves best the intended measurement setup. The radiation pattern of a local node 300a, 300b may be configured, for example, to include a main lobe 312a, 312b that exhibits a greater field strength, and one or more side lobes 314a, 314b. The main lobe and the side lobes can be oriented to provide an optimal joint operation for the radar and communications functions from the waste management point of view. In the example of FIG. 3, a main lobe 312a, 312b has been designed to be directed through the empty upper part 322 towards the refuse-filled lower part 324 so that a maximum resolution in measurements for the fill state determinations of the radar unit of the local node is achieved. A side lobe 314a, 314b has been directed towards an access point of the radio access network to enable transmissions of the radio interface unit of the local node. In some applications, the order could be reversed so that the main lobe of the radiation pattern is applied to facilitate radio communication and a side lobe is applied to the range measurements. Also other orientations may be applied within the scope. One or more local nodes with similar or different operational setups may be used to determine fill state information on the container. Furthermore, measured information from one local node may be used in determining fill state information on one or more containers in a waste collection site.

Figure 4:
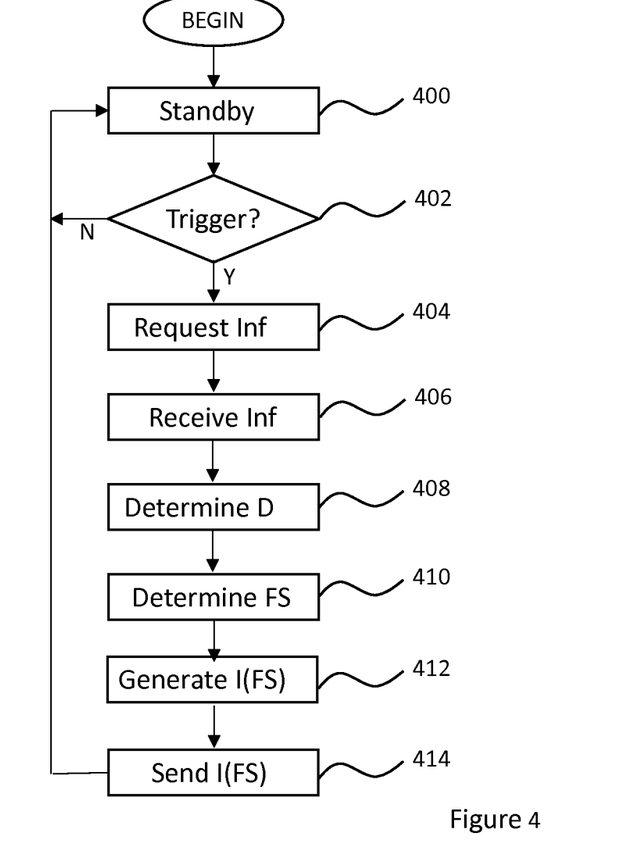
FIG. 4 illustrates stages of a method implemented in the radar unit of the local node.

The flow chart of FIG. 4 illustrates stages of a method implemented in the radar unit of the local node described in FIGS. 1 to 3. The method begins when the radar unit is switched on and standby (stage 400) to operate. The radar unit may first trigger a fill state measurement (402) according to a predefined measurement scheme. The measurement may be triggered internally, for example, the measurement may be timed to occur at defined intervals. The applied interval may be fixed or be configured to change dynamically according to a fill state of the container detected with previous measurement(s). Alternatively, the measurement may be triggered externally, for example, by a command sent from a remote control node and conveyed through the radio interface unit to the radar unit of the local node. In response to the detected triggering, the radar unit may request (stage 404) information on uplink or downlink signals from the radio interface block. It should be noted that stages 402 and 404 are not essential to the method of the radar unit, delivery of the information on signals may be controlled by the radio interface block and initiating the measurement may not need the separate triggering and requesting stages 402, 404 in the radar unit, shown in FIG. 4.

For the measurement, the radar unit receives (stage 406) from the radio interface unit predefined information on one or more signals transmitted or received by the radio interface unit. The received predefined information is advantageously, but not necessarily, based on signals that result from normal communication operations of the radio interface unit. In other words, the radar unit may reuse information on signals transmitted or received by the radio interface unit without a separate trigger or request by the radar unit. On the other hand, both the radar unit and the radio interface unit may be configured to operate jointly so that the radio interface unit may send and receive signals in response to a request by the radar unit. The predefined information may include, for example, a signal as such, a part of a signal, data derived from a signal by the radio interface unit, information on timing of a specific signal, a sequence of signals with timing thereof, etc. For example, in case of 4G LTE or 5G NR radio interface, the predefined information may include one or more reference signals or synchronisation signals or physical channel data streams.

The predefined information conveys an indication of a delay, i.e. the time of flight (ToF) of a radio interface unit signal that is transmitted and then reflected from an object. The form and use of indication of the delay depends on the type of the predefined information forwarded to the radar unit and also on the type of the radar. In the example of FIG. 3, the reflection causing the delay occurs in the boundary between the empty upper part 322 and the refuse filled lower part 324 of the container 320.

When the delay is known, the distance from the local node to the boundary between the empty upper part and the refuse filled lower part of the container can be determined (stage 408). If the radar unit operates as a conventional radar system where a transmitter and a receiver are co-located in the radio interface unit, the distance to the reflecting object can be computed from the detected delay, i.e. from the time taken for the signal to travel from the radio interface unit to the objects inside the container and back. If we denote this delay with $\tau$, the distance D can be computed as $$D=(c*\tau)/2$$

where c is speed of light.

If the radar unit operates as a passive radar system, transmission of signals is not controlled by the local node. The delay and thus distance to a reflecting object can, however, be determined from the time difference of arrival between a signal arriving to the radio interface unit directly from an access node of the radio access network and a signal arriving via the reflecting object. For example, correlation of a signal with a delayed copy of itself in a synchronisation sequence between the radio interface unit and an access node of the applied radio access network may be used in estimating the delay caused by the distance between the local node and the reflecting refuse object(s).

When the position of the local node is known, and the distance is from the local node to the boundary between the empty upper part and the refuse-filled lower part of the container is known, the fill state of the container can be easily determined (stage 410) through simple calculations. In the example cases of FIG. 3, the calculation in local node 300a is straightforward. If the height of the container is H0 and the measured distance is H(t), a fill state FS can be expressed as FS=H(t)/H0*100. In the local node 300b, the monitored direction, e.g. the angle of the beam of the main lobe 312b may need to be considered in the calculations. Finally, an indication of the determined fill state is generated (stage 412) sent (stage 414) to the control node of the waste management system.

Figure 5:
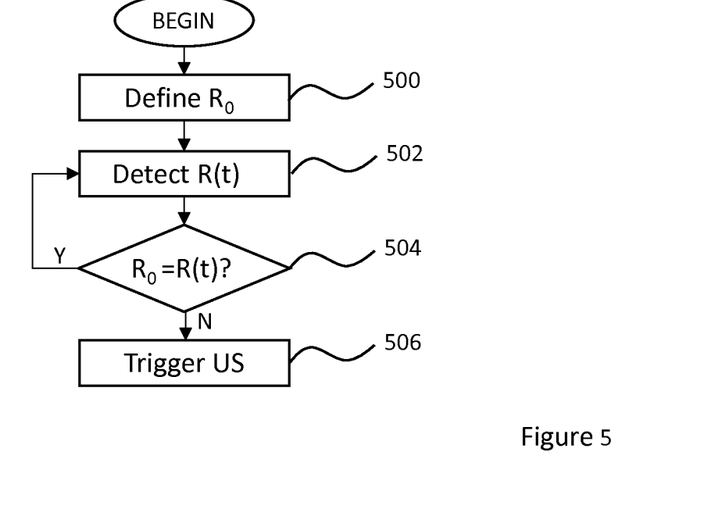
FIG. 5 illustrates an example of further use case for the local node.

In an aspect, the local node may be used to implement an additional service that improves user experience in the local waste management site. Accordingly, in addition to controllably detecting and transmitting fill state to the control node, the radar unit may be configured to detect a user closing the site or the container and trigger a user service function in response to the detection. FIG. 5 illustrates this example with stages of a method implemented in the radar unit of the local node.

The method begins when the radar unit is switched on and standby to operate. When the local node is mounted to its known position, the radar unit may be arranged to use the information derived from signals of the radio interface unit to create a radar image from a region surrounding local node. In the absence of any moving objects or creatures, this radar image Ro remains practically unchanged. In order to detect a user approaching the site, the radar unit may be configured to create the radar image R(t) in certain intervals n (stage 502) and compare the detected radar image R(t) to Ro (stage 504). If R(t) is equal to Ro, it can be deduced that there is no user approaching the container. On the other hand, if T(t) is different from Ro, a detection of a user approaching the container can be made. In this case, the radar unit is configured to trigger a predefined user service function. This user service function may include, for example, activation of a software application in the local node. The application may be programmed, for example, to control a mechanism that opens and closes the container. In this case, the application can open the container so that it is ready for the approaching user. The user can thus throw away the trash without touching any dirty parts of the container.

Figure 6:
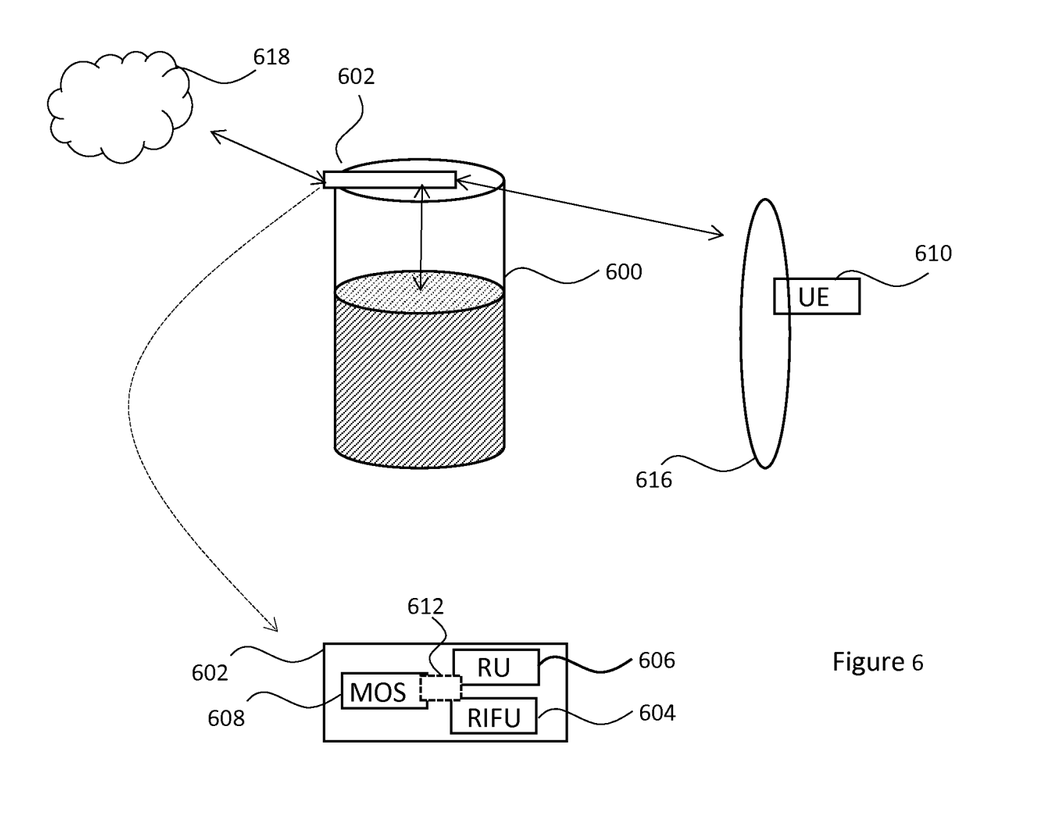
FIG. 6 illustrates a further use case for the local node.

FIG. 6 illustrates a further example of an implementation where the coming user is identified, and the local node is further used to ensure that the container opens only to authorised users. FIG. 6 shows a container 600 and a local node 602 that includes a radio interface unit 604 and a radar unit 606 Further description on these elements may be referred from FIGS. 1 to 5. In this example, the local node includes also a mechanical opening system (MOS) 608 that is arranged to respond to a predefined input signal by opening access to the container (e.g. opening a lid of the container or unlocking a lid of the container). Advantageously, but not necessarily, the mechanical opening system 608 is connected to the radio interface unit 604 and the radar unit (RU) 606 through a common interface 612 (cf. interface 204 of FIG. 2) across which these elements of the local node can exchange information. FIG. 6 shows also a user 616 that carries a user element 610.

The local node 602 is arranged to use signals of the radio interface unit (RIFU) 604 to communicate over a radio access network 618, and in the claimed manner use signals of the radio interface unit 604 as input information of the radar unit 606 and thereby monitor the fill state of the container 600. The local node 602 may be further configured to use input information to detect that the user 610 approaches the container, for example in the manner described with FIG. 5. Alternatively, the user 610 approaching the container may be prompted (e.g. by signs or other conventional means) to identify oneself by contacting the waste management system. This contact and identification may be implemented in many ways, but eventually the local node is arranged to receive information that confirms identity of the coming user. For example, the contact can be created by means of a mobile application in the user equipment (UE) 610. Alternatively, the user equipment can contact the remote control node of the waste management system (cf. FIG. 1) and identify the user there. After a successful identification, the remote node can send to the local node a request to open the container. Other routes and means of user identification may naturally be applied within the scope. Having received the information that confirms identity of the user, the local node is configured to detect a successful identification and create the predefined input signal to the mechanical opening system 608. As a result, the mechanical opening system 608 allows the user 616 to access the container 600, and any unauthorised use is disabled.

The local node or the remote control node may also use the contact to the user, created for the identification, to provide advice, like sorting instructions to the user. It should be noted that these user services are examples, other user service functions enabled through user detection and/or identification are included in the scope.

In an example, the radar unit may be configured to compute from the signals of the radio interface unit the form of an object that a user intends to insert into the container. Such computation could include, for example, creation of a radar image and pattern recognition from the radar image. If the detected form of the object is not compliant with parameters predefined for the container, the radar unit is configured to trigger the local node to output a user indication (light indication, sound alarm, recorded voice instruction) so that the user can interrupt the incorrect action and e.g. insert the object to another container in the same waste collection site.

By adjusting the radiation pattern of the antenna system of the radio interface unit appropriately, and analysing the predefined information gathered from transmitted or received signals of the radio access, the local node may communicate and thus network with other components of the waste management system. The signals from the radio interface convey information reflections of the signals in the surroundings of the local node, so the same signals transmitted from the radio interface unit are used for range measurements for fill state detection of at least one container in one direction. Moreover, the local node may implement user detection in another direction. Depending on the processing capacity in the local node, all these functions can be implemented in turns or even in parallel.

The invention claimed is:

1. A method performed in a local node of a waste management system, comprising
  using radio signals of a radio interface unit of the local node for communication in the radio access network, wherein the radio signals are specified for radio access and communication in a radio access network;
  using predefined information on one or more of said radio signals specified for radio access in the radio access network transmitted or received by the radio interface unit of the local node as radar input data, the said one or more of said radio signals being the same one or more of said radio signals used by the radio interface unit for the radio access and communication;
  determining a distance from the local node to objects inside a container from the radar input data;
  determining a fill state of a container from the determined distance;
  generating an indication of the fill state of the container; and
  transmitting the indication of the fill state of the container to a control node of a waste management system.

2. A local node of a waste management system, comprising
  a radio interface unit configured for communication using radio signals specified for radio access and communication in a radio access network;
  a radar unit; and
  an interface enabling exchange of information between the radio interface unit and the radar unit; wherein
  the radar unit is configured to receive from the radio interface unit predefined information on one or more of said radio signals specified for radio access in the radio access network transmitted or received by the radio interface unit, the said one or more of said radio signals being the same one or more of said radio signals used by the radio interface unit for the radio access and communication;
  the radar unit is configured to use the predefined information as radar input data;
  the radar unit is configured to determine a distance from the local node to objects inside a container from the radar input data received from the radio interface unit;
  the radar unit is configured to determine a fill state of the container from the determined distance;
  the radar unit is configured to generate an indication of the fill state of the container and forward it to the radio interface unit; and the radio interface unit is configured to transmit the indication of the fill state of the container to a control node of the waste management system.

3. A local node according to claim 2, wherein the predefined information conveys an indication of a delay of a signal that is transmitted and then reflected from the objects inside the container.

4. A local node according to claim 3, wherein the radar unit is an active radar configured to
determine the delay as a time of flight of a signal transmitted by the radio interface unit and then reflected from the objects inside the container;
determine the distance from the local node to objects inside the container from the determined time of flight.

5. A local node according to claim 4, wherein
the radio interface unit is configured to transmit one or more signals in response to a request by the radar unit;
the radar unit is configured to receive from the radio interface unit predefined information related to the one or more transmitted signals;
the radar unit is configured to compute the delay from the predefined information related to the one or more transmitted signals.

6. A local node according to claim 3, wherein the radar unit is a passive radar configured to
receive from the radio interface unit a synchronisation sequence between the radio interface unit and an access node of the applied radio access network;
estimate the delay from correlation of a signal with a delayed copy of itself in the synchronisation sequence;
determine the distance from the local node to objects inside the container from the estimated delay.

7. A local node according to claim 2, wherein the one or more signals of the predefined information are signals transmitted or received by the radio interface unit independently of the operation of the radar unit.

8. A local node according to claim 2, wherein
the radar unit is configured to use the predefined information to detect a user closing the site or the container;
the radar unit is configured trigger a user service function in response to the detection of the user.

9. A local node according to claim 8, wherein the user service function includes activation of a software application in the local node.

10. A local node according to claim 2, wherein
the local node includes a mechanical opening system arranged to respond to a predefined input signal by opening access to the container;
the local node is arranged to provide the predefined signal in response to receiving information that confirms identity of a user of the container.

11. A local node according to claim 2, wherein
the radar unit is configured to use the predefined information from the radio interface unit to compute a form of an object that a user intends to insert into the container;
the radar unit is configured to detect if the detected form of the object is compliant with parameters predefined for the container;
the radar unit is configured to trigger an output of a user indication, if the detected form of the object is not compliant with parameters predefined for the container.

12. A container including a local node of claim 2.

* * * * *